United States Patent
Noritomi

[11] Patent Number: 5,944,796
[45] Date of Patent: Aug. 31, 1999

[54] SYSTEM FOR TRANSMITTING DATA WITHIN A RANGE SUCH THAT THE TRANSMISSION DATA DOES NOT EXCEED PRESCRIBED UNITS IN RESPONSE TO TRANSMISSION PROCESSING SPEED

[75] Inventor: Masami Noritomi, Kanagawa, Japan

[73] Assignee: Sony Corporation, Tokyo, Japan

[21] Appl. No.: 08/916,556

[22] Filed: Aug. 22, 1997

[30] Foreign Application Priority Data

Aug. 26, 1996 [JP] Japan .................................. 8-223697

[51] Int. Cl.$^6$ ....................................................... G06F 13/00
[52] U.S. Cl. ............................................................ 709/232
[58] Field of Search .................................... 709/200, 201,
709/203, 212, 213, 217, 218, 219, 220,
221, 223, 224, 225, 232, 233, 234

[56] References Cited

U.S. PATENT DOCUMENTS

| | | | |
|---|---|---|---|
| 4,825,208 | 4/1989 | Mueller et al. | 370/236 |
| 4,860,193 | 8/1989 | Bentley et al. | 710/55 |
| 5,235,685 | 8/1993 | Caldara et al. | 710/128 |
| 5,623,622 | 4/1997 | Yuki et al. | 709/212 |
| 5,778,198 | 7/1998 | Kadota | 710/106 |
| 5,799,150 | 8/1998 | Hamilton et al. | 709/217 |
| 5,819,083 | 10/1998 | Chen et al. | 707/10 |

*Primary Examiner*—Moustafa M. Meky
*Attorney, Agent, or Firm*—Frommer Lawrence & Haug, LLP; William S. Frommer

[57] ABSTRACT

A transmission data processing method for transmitting inputted data comprises a data management step, a transmission data providing step and a transmission step. The transmission data providing step transmits the transmission data to the transmission step within a range such that the transmission data does not exceed prescribed units, in response to a transmission processing speed of the transmission step for transmitting the transmission data. The capturing of transmission data sent from a host computer and the work of file editing and saving can then be carried out separately from the operation of the transmission system so it is possible to receive and hold large amounts of transmission data. The load of capturing the transmission data can also be dispersed because the transmission data is sent to the transmission system in amounts that do not exceed a decided data amount.

16 Claims, 3 Drawing Sheets

SYSTEM FOR TRANSMITTING DATA WITHIN A RANGE SUCH THAT THE TRANSMISSION DATA DOES NOT EXCEED PRESCRIBED UNITS IN RESPONSE TO TRANSMISSION PROCESSING SPEED

BACKGROUND OF THE INVENTION

The present invention relates to a transmission data processing method and processing device and more particularly relates to a transmission data processing method and processing device for large volumes of broadcast program data at broadcast stations.

At broadcast stations, broadcast program data such as, for example, commercial programs etc. is stored on a data storage medium referred to as a library. Broadcast program data is then played back as required in accordance with the program broadcast schedule and broadcasted. With the transmission of this broadcast program data, a transmission system comprising a workstation or personal computer receives transmission data in advance from the data storage medium under the control of a higher-level host computer so as to give an automatic operation where the transmission system transmits broadcast programs based on the received transmission data.

However, in a related transmission system for commercials etc. for broadcast stations, the transmission data is received directly from the higher-level host computer but as there is a limit to the data processing power of the transmission system, it has been difficult to, for example, receive and process large quantities of transmission data spanning a few weeks at one time.

Namely, with usual computers applicable to transmission systems there is a limit to the transmission data that can be stored, with these computers not being suited to storing large amounts of data exceeding, for example, two to three days of transmission data.

Further, when the transmission data is stored as a file and file making and management processes are carried out with respect to this file, this file making and management processing is carried out in parallel with the work of transmitting the transmission data. There is therefore a fear that the transmission system will be a hindrance to the transmission processing of the transmission data itself.

Further, when the transmission system receives a large amount of transmission data from an upper level host computer, the data capturing itself is time consuming and is a hindrance to transmission.

Resolving the above problems on the side of the upper-level host computer has been considered but the upper level host computer side also exerts overall control over complex transmissions. The device would therefore have to be added to in order to carry out the more complex control involved in processing large amounts of data exceeding the amount of transmission data for two or three days. This makes the device extremely large, makes operation complicated and the cost prohibitive.

On the other hand, with a small scale system in which a host computer does not exist, a large amount of transmission data is given at one time and this transmission data is not held. Therefore, as an operator or manager has to directly carry out operations for the inputted transmission data, that person has to stay permanently to carry out these operations and therefore cannot move away from the transmission system for a long period of time.

SUMMARY OF THE INVENTION

It is therefore the object of the present invention to provide a transmission data processing method and processing device capable of receiving and storing large amounts of transmission data comprising broadcast program data such as commercials etc. and capable of unmanned automatic program broadcasts.

Therefore, according to a first aspect of the present invention, a transmission data processing method for transmitting inputted data comprises a data management step, a transmission data providing step and a transmission step. Thedata management step is for reading the inputted data, managing the read data and transmitting the data. The transmission data providing step is for outputting the data outputted in the data management step as transmission data. The transmission step is for holding the transmission data outputted in the transmission data providing step in prescribed units and transmitting the transmission data at a prescribed time. Here, the transmission data providing step transmits the transmission data to the transmission step within a range such that the transmission data does not exceed the prescribed units, in response to a transmission processing speed of the transmission step for transmitting the transmission data.

Further, the data management step can further comprises a data file management step of reading the inputted data, editing the read data to files and managing the data in file units, and transmitting the data and a storage step of storing the data edited in file units in the data file management step in a storage unit.

The storage unit can be a recording medium capable of being non-linear accessed.

Moreover, the data file management step can further comprise a data reading step of reading the inputted data and transmitting the data and a file management step of editing the data read in in the data reading step and managing the data stored in the storage unit in file units.

The transmission data processing method of the present invention can further comprise an editing step of editing the data read in the data management step.

The transmission data processing method can further comprise a local mode processing step of temporarily halting reading of the data inputted in the data management step and outputting the data read beforehand in the data management step to the transmission data providing step.

This transmission data processing method can further comprise a rehearsal step for previewing the read data inputted in the data management step.

This transmission data processing method can further comprise a dispatch step of only outputting control instruction data of the inputted data to the data management step and the transmission step or to the transmission step, and outputting data other than the control instruction data to the data management step.

According to the transmission data processing method of the present invention having the above configuration, the capturing of transmission data sent from a host computer and the work of file editing and saving is carried out separately from the operation of the transmission system. It is therefore possible to receive and hold large amounts of transmission data.

Further, the load of capturing the transmission data can be dispersed because the transmission data is sent to the transmission system in amounts that do not exceed a decided data amount.

According to a second aspect of the present invention, a transmission data processing device for transmitting inputted data comprises a data management unit, a transmission data provider and a transmission unit. The data management unit is for reading the inputted data, managing the read data and transmitting the data. The transmission data provider is for outputting the data outputted from the data management unit as transmission data. The transmission unit for holding the transmission data outputted by the transmission data provider in prescribed units and transmitting the transmission data at a prescribed time. Here, the transmission data provider transmits the transmission data to the transmission unit within a range such that the transmission data does not exceed the prescribed units, in response to a transmission processing speed of the transmission unit for transmitting the transmission data.

Further, the data management unit can further comprise a data file management unit for reading the inputted data, editing the read data to files and managing the data in file units, and transmitting the data and a storage unit for storing the data edited in file units by the data file management unit.

The storage unit can be a recording medium capable of being non-linear accessed.

Moreover, the data file management unit can further comprise a data reading unit for reading the inputted data and transmitting the data and a file management unit for editing the data read in by the data reading unit and managing the data stored in the storage unit in file units.

The transmission data processing device of the present invention can further comprise an editor for editing the data read by the data management unit.

This transmission data processing device can further comprise a local mode processor for temporarily halting reading of the data inputted by the data management unit and outputting the data read beforehand by the data management unit to the transmission data provider.

The transmission data processing device can further comprise a rehearsal unit for previewing the read data inputted by the data management unit.

Still further, this transmission data processing device can further comprise a dispatch unit for only outputting control instruction data of the inputted data to the data management unit and the transmission unit or to the transmission unit, and outputting data other than the control instruction data to the data management unit.

According to the transmission data processing device of the present invention having the above configuration, the transmission data processing mechanism is capable of receiving and holding a large amount of transmission data without influencing the operation of the transmission system.

Further, the load of capturing the transmission data is dispersed because transmission data is sent to the transmission system in amounts that do not exceed a decided amount of data by the transmission data provider.

DETAILED DESCRIPTION OF THE PREFERRED EMBODIMENTS

First Embodiment

The following is a description of the embodiment of the present invention.

Figure 1:
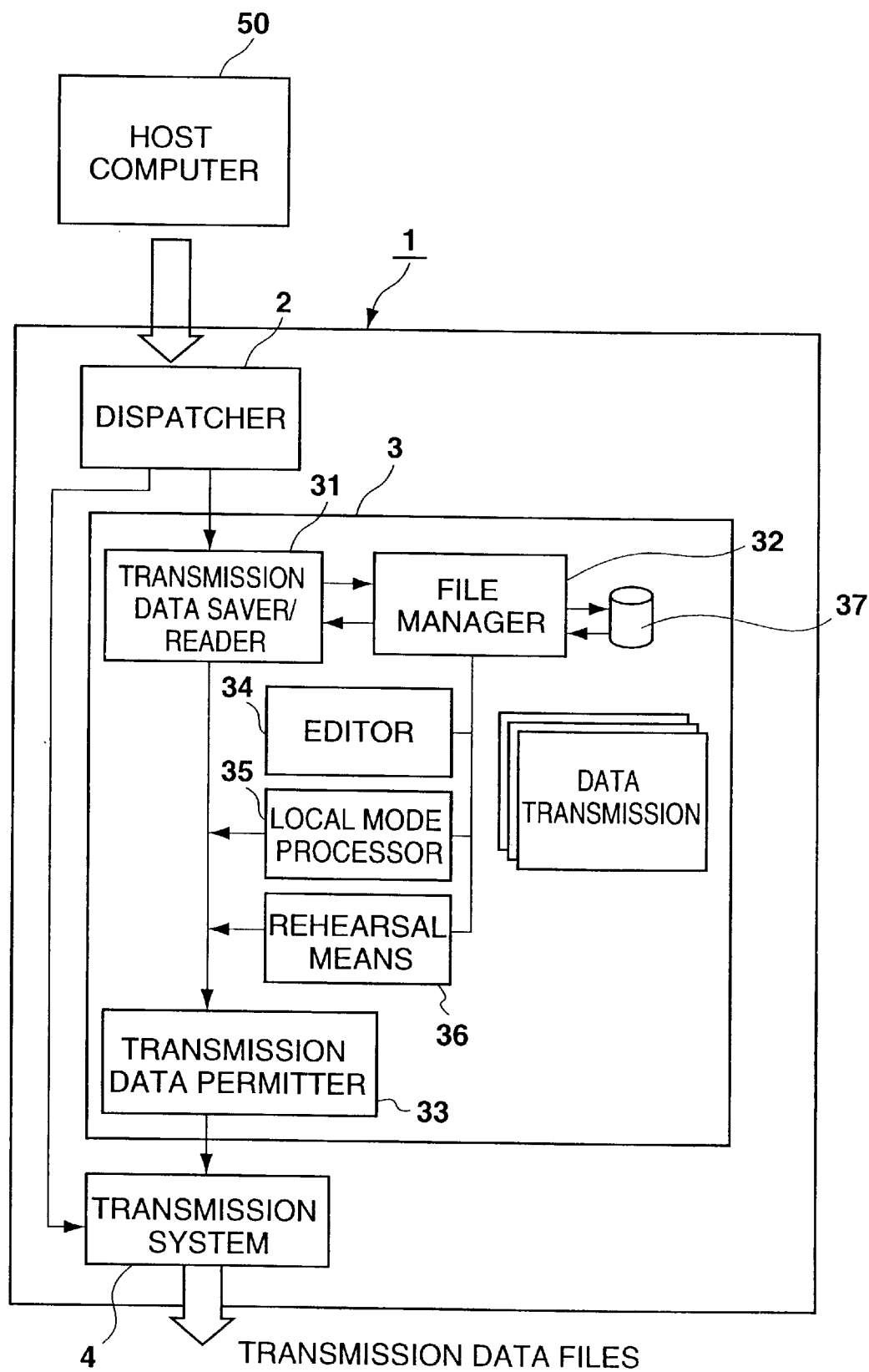
FIG. 1 is a block diagram of a configuration of an embodiment of a transmission data processing device relating to the present invention.

FIG. 1 is a block diagram of the configuration of the embodiment of the transmission data processing device relating to the present invention.

As shown in FIG. 1, a transmission data processing device 1 comprises a transmission data processing mechanism 3 for receiving transmission data prepared by a host computer 50 and outputting transmission data that has been processed and managed and a transmission system 4 for transmitting transmitted data from the transmission data processing mechanism 3 as broadcast data.

The transmission data processing device 1 comprises a work station or a personal computer. The transmission system 4 is in the form of programs capable of being executed by a Central Processing Unit (hereinafter referred to as "CPU") of a workstation or personal computer.

The transmission data processing mechanism 3 comprises a transmission data saver/reader 31, a file manager 32 and a transmission data provider 33 for programs that are executed by whichever CPU.

There are also provided an editor 34, local mode processor 35 and rehearsal means 36 for programs executed by whichever CPU.

The transmission data saver/reader 31 takes in an especially large amount of transmission data transmitted from the host computer 50 and passes this over to the file manager 32 or reads transmission data present in the contents of files from the file manager 32 and provides this to the transmission data provider 33.

The file manager 32 edits large amounts of captured transmission data for transferal to and storage on a storage device such as a Hard Disc Drive (hereinafter referred to as "HDD"). For ease of processing and handling, it is preferable for, for example, transmission data of the same transmission day to be gathered together.

The file manager 32 then makes a look-up table starting with file updating (replacement, addition, deletion) and file ranking.

The file manager 32 stores both the newest data edited by the editor 34 to be described later and the newest data sent from the host computer 50 or either edited data from the transmission data provider 33 or data transmitted from the host 50 to the transmission system 4 so as to instruct the transmission data provider 33.

Updating of files is not just the updating of transmission data that has not yet been transmitted to the transmission system 4 but is also the updating of transmission data (files) that have already been transmitted when an instruction from the host computer 50 has reached the dispatcher 2.

In order to provide restoration at the time of a fault, rather than immediately erasing the transmission data given to the transmission system 4, the file manager 32 saves using the same file units, with a configuration where just the newest files of a fixed amount only are saved being the most preferable. The save period is decided using the amount of space on the hard disc.

A configuration where transmission data for an arbitrary file is provided again as a result of a manual operation is also possible.

The transmission data provider 33 constantly checks the amount of transmission data currently held by the transmission system 4 and if empty, provides the contents of files managed by the file manager 32 to the transmission system 4 as transmission data. Here, the amount of transmission data provided to the transmission system 4 is taken to be an amount that does not exceed an amount of data decided beforehand in response to the processing speed of the transmission system 4.

Namely, even if the free memory space of the transmission system 4 for transmission data is large, the transmission data provider 33 sends transmission data to the transmission system 4 so as not to provide a large amount of transmission data at one time, that is, so that the processing power of the transmission system 4 is not exceeded. Specifically, this is executed by, for example, updating file look-up tables made at the file manager 32. Namely, when the file manager 32 updates the list for the pointer address of the added data, information for this added data is referred to by the transmission system 4 and the added data is copied in accordance with this list.

There are also cases where a reduced amount of transmission data for the transmission system 4 becomes transmitted or where a day change is received from the host.

To give an example, with a one day portion, i.e., 1500 items, of commercial programs taken as one group, the transmission system 4 only holds a two-day portion (that particular day and the following day). On the other hand, the transmission data processing mechanism 3 stores all of the transmission data as files on a day-by-day basis.

Directly after day changeover, the transmission system 4 only holds a one day portion of data and surplus therefore exists. Then, for example, commercial programs for the new following day are provided to the transmission system 4 by the transmission data processing mechanism 3 in units of 50 items (depending on the setting). With this configuration, the load placed on the transmission system 4 is dispersed and a temporarily excessive amount of transmission processing can be avoided.

The transmission data processing mechanism 3 sends that which is already set of both the newest data edited in the above way and the newest data sent from the host to the transmission system 4 based on an instruction from the file manager 32.

On the other hand, the editor 34 is capable of reading and editing transmission data from the files so that editing of all of the transmission data is possible.

The transmission data saver/reader 31 is capable of executing previews (rehearsal transmissions). By carrying out rehearsal transmissions it is possible to confirm rehearsal transmissions for all of the transmission data for up to a few days after by reading transmission data to be broadcast in the future in file units. Namely, transmission data transmitted from the rehearsal means 36 can be displayed on a display device 38 such as a monitor etc. At this time, the file manager 32 does not erase the file indicating the transmission data stored at a storage device 37 and the transmission data itself is also not erased from the storage device 37.

The local mode processor 35 does not communicate with the host computer 50 and only executes the function of providing transmission data to the transmission system 4.

As data arriving from the host computer 50, in addition to the transmission data, there is also the case of a configuration where control instruction data is added.

To correspond with this, it is possible to further equip the device of the present invention with the dispatcher 2 for discriminating between and then distributing transmission data and control instructions arriving from the host computer 50.

The dispatcher 2 ensures that, of the data arriving from the host computer 50, the transmission data arrives at the transmission data processing mechanism 3, while on the other hand, control instruction data arrives at just the transmission system 4 or both the transmission system 4 and the transmission data processing mechanism 3, in accordance with the contents of this control instruction data.

For example, when the control instruction data instructs the updating of a file including a transmission data edit, this control instruction data reaches both the transmission system 4 and the transmission data processing mechanism 3, i.e. transmission data transmitted to the transmission system 4 is edited at the transmission system 4. On the other hand, file updating is executed at the transmission data processing mechanism 3 regardless of whether there has already been a transmission or not.

Figure 2:
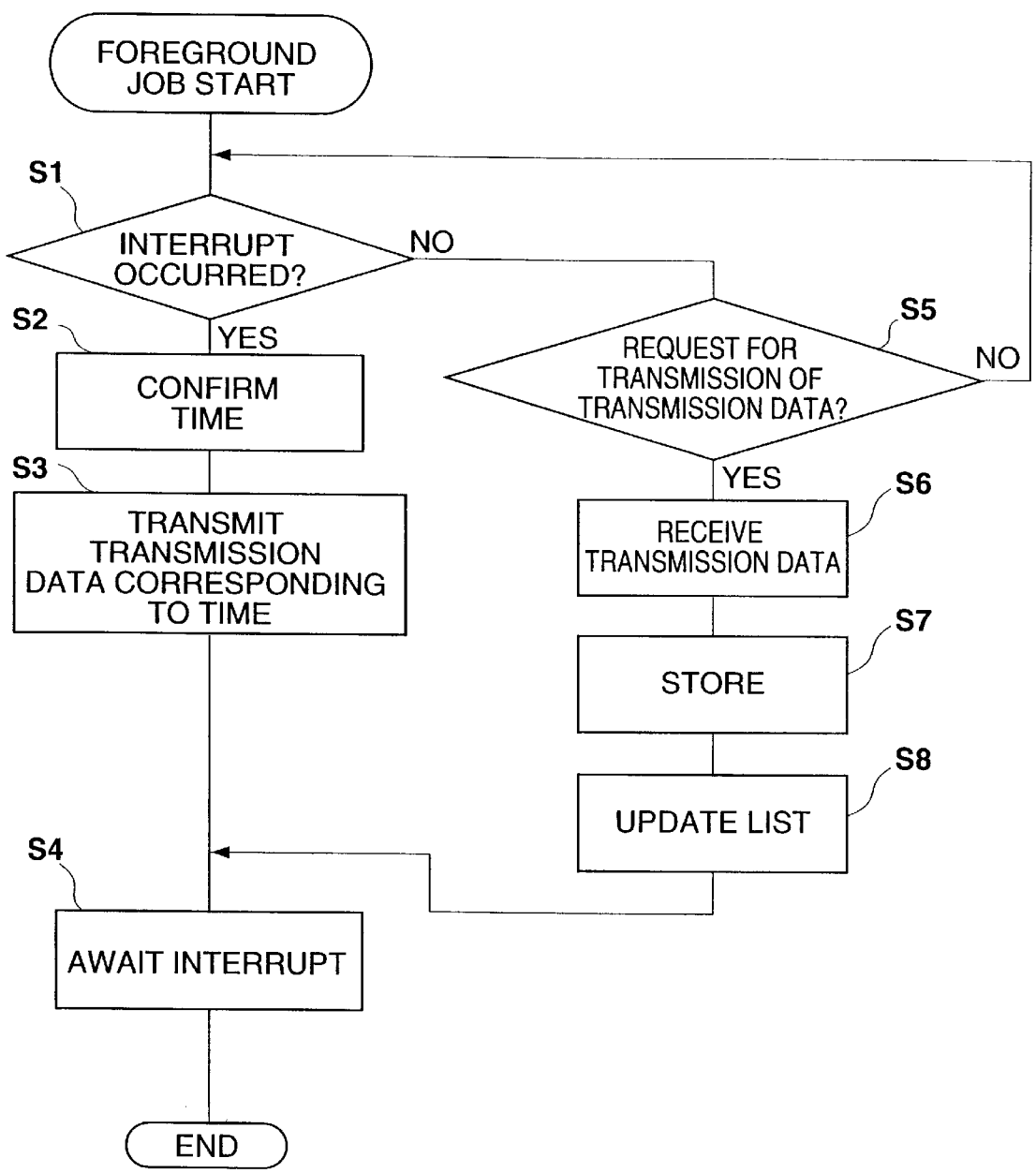
FIG. 2 is a flowchart of a foreground job of a transmission data processing device relating to the present invention.

A description of the operation of the embodiment of the transmission data processing device 1 relating to the present invention will now be given based on the appended flowchart. FIG. 2 is a flowchart of a foreground job of the transmission data processing device 1 and corresponds to the operation of the transmission system 4.

In FIG. 2, when the foreground job starts, the system enters an interrupt wait state. At a pre-decided time, when an interrupt signal from a progress clock (or built-in clock) is inputted (step S1), the time is confirmed (step S2) and transmission data corresponding to this time is transmitted (step S3). When the transmission of the transmission data is complete, the interrupt wait state is entered (step S4).

On the other hand, when there is no interrupt signal input in step S1 and there is also no transmission request from the transmission data processing mechanism 3 (step S5), a loop is formed where step S1 is returned to.

If there is a transmission request from the transmission data processing mechanism 3 (step 5S), transmission data from the transmission data processing mechanism 3 is received (step S6), stored in an appropriate position (step S7), the list is updated (step S8) and step S4 is proceeded to.

Figure 3:
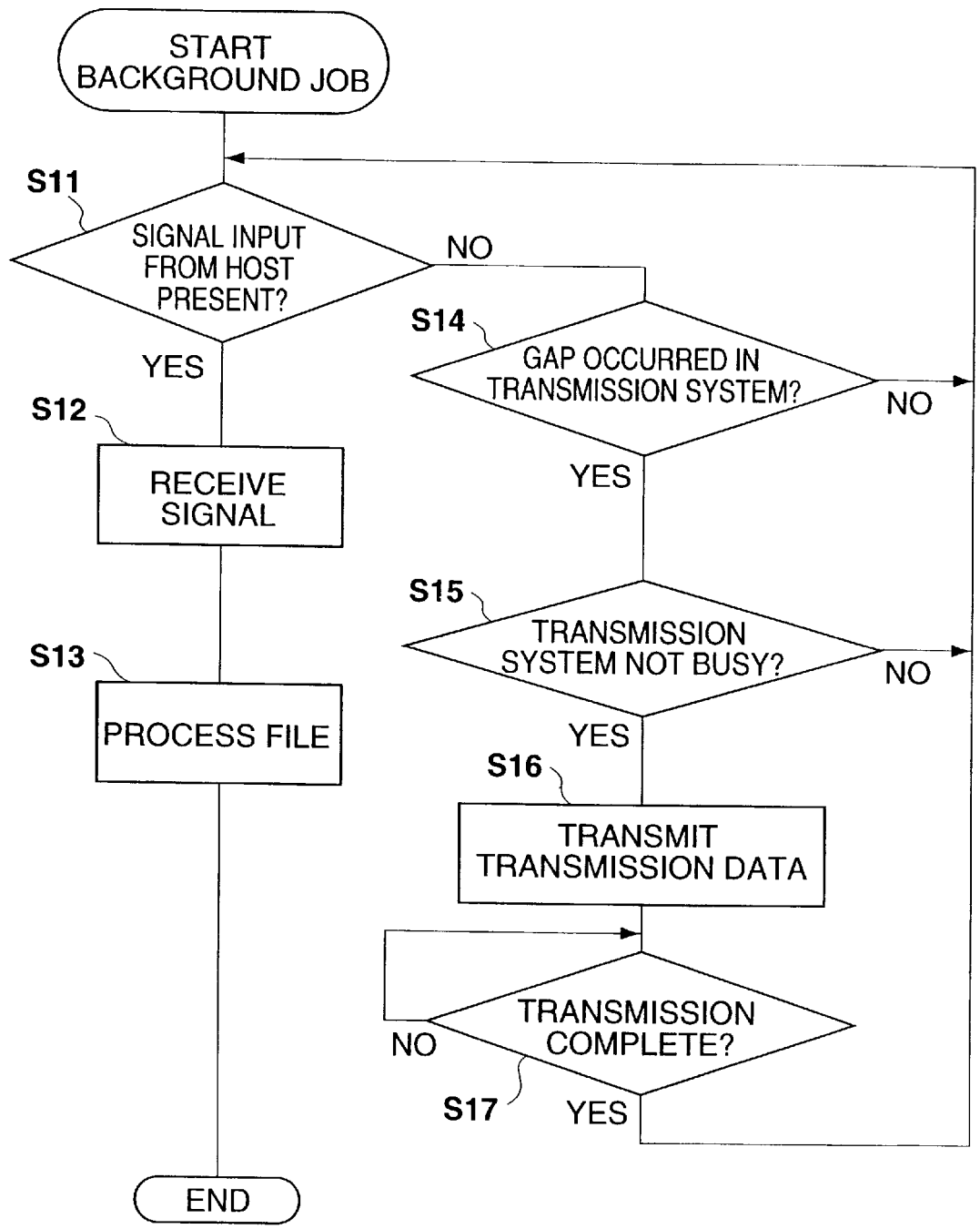
FIG. 3 is a flowchart of a background job for the transmission data processing device relating to the present invention.

FIG. 3 is a flowchart of a background job of the transmission data processing device 1 and corresponds to the operation of the transmission data processing mechanism 3.

When the background job starts, the existence of a signal input from the host computer 50 is confirmed (step S11). If there is an input signal from the host computer 50, i.e. if transmission data is present, this is received (step S12) and a string of file processes are performed (step S13).

In step S11, while there is no signal input from the host, a loop of (step S14) returning to step S11 is formed when the generation of spaces is not detected in the transmission system 4 by the transmission data provider 33.

When the generation of spaces is detected at the transmission system 4 in step S14, whether or not the transmission system 4 is not busy at this time is then confirmed (step S15) and if the transmission system 4 is not busy, step S11 is returned to.

On the other hand, if, in step S15, the transmission system 4 is not busy, transmission data is transmitted to the transmission system 4 by the transmission data provider 33 (step S16). When the transmission is complete, step S11 is returned to.

As becomes clear from the above operation, the transmission data processing device 1 relating to the present invention executes the transmission of broadcast data in real time as a foreground job and can effectively receive and save large amounts of transmission data as a background job by utilizing this time. Further, file management, data editing and rehearsals etc. can be executed as background jobs.

In the aforementioned configuration, the dispatcher 2 is of a stand-alone configuration and is not part of the transmission data processing mechanism 3 but it is also possible to have a configuration where the dispatcher 2 is included in the transmission data processing mechanism 3.

Further, with the above configuration, the transmission data processing mechanism 3 and the transmission system 4, or the dispatcher 2, transmission data processing mechanism 3 and transmission system 4 are provided as separate processes within the same computer capable of multiprocessing. However, the present invention is by no means limited in this respect and, for example, a configuration where these items are distributed across a plurality of computers can also be adopted. In the case of this distributed configuration, a configuration where connections are provided across each computer via a LAN or appropriate network.

As described in detail above, a transmission data processing method of a first aspect of the present invention comprises a data management step of reading the inputted data, managing the read data and transmitting the data, a transmission data providing step of outputting the data outputted in the data management step as transmission data and a transmission step of holding the transmission data outputted in the transmission data providing step in prescribed units and transmitting the transmission data at a prescribed time.

As a result, the capturing of transmission data transmitted from the host computer and the work of file editing and saving is executed separately from the operation of the transmission system. The receiving and saving of a large amount of transmission data is then possible without hindering the operation of the transmission system.

Further, the load of capturing the transmission data is therefore dispersed because only an amount of transmission data that does not exceed the decided data amount is sent to the transmission system at a time.

The transmission data processing method relating to the present invention can also comprise an editing step of editing the data read in the data management step. Since the contents of a stored file are edited, editing of transmission data that is not in the transmission system is also possible. This makes editing of large amounts of transmission data possible and thus improves handling.

The transmission data processing method of the present invention can also further comprises a local mode processing step of temporarily halting reading of the data inputted in the data management step and outputting the data read beforehand in the data management step to the transmission data providing step. A broadcasting operation can then continue independently even when there are hindrances on the host computer side. Further, it is also possible to handle transmission data for long periods even when there is no host computer by making files beforehand.

Still further, the transmission data processing method relating to the present invention can also further comprise a rehearsal step for previewing the read data inputted in the data management step. Rehearsal transmissions for all of a large quantity of transmission data are then possible using transmission data stored in the file. This therefore provides an extremely effective function when compared with the related art where rehearsal playback was only possible for transmission data present in the transmission system.

Further, a transmission data processing method relating to the present invention can further comprise a dispatch step of only outputting control instruction data of the inputted data to the data management step and the transmission step or to the transmission step, and outputting data other than the control instruction data to the data management step. A system construction can then be adopted where a control instruction signal is given from the host computer and a more effective function can be realized.

In another aspect of the present invention, a transmission data processing device comprises a data management unit for reading the inputted data, managing the read data and transmitting the data, a transmission data provider for outputting the data outputted from the data management unit as transmission data and a transmission unit for holding the transmission data outputted by the transmission data provider in prescribed units and transmitting the transmission data at a prescribed time. Here, the transmission data provider transmits the transmission data to the transmission unit within a range such that the transmission data does not exceed the prescribed units, in response to a transmission processing speed of the transmission unit for transmitting the transmission data. The capture of transmission data transmitted from the host computer and the execution of file editing and saving can then be carried out separately from the operation of the transmission system. The receiving and saving of large amounts of transmission data is therefore possible without hindering the operation of the transmission system.

The load of capturing the transmission data is then dispersed by transmitting an amount of transmission data that does not exceed a decided data amount to the transmission system at a time.

Further, by holding files for a fixed period (decided by the space available on a hard disc), transmission data for which providing to the transmission system is complete can also be used in restoration in the case where a hindrance occurs in the transmission system and the transmission data is damaged.

The transmission data processing device of the present invention can further comprise an editor for editing the data read by the data management unit. Editing of transmission data not in the transmission system is therefore also possible, as is editing of large amounts of transmission data which brings about improved handling.

Still further, the transmission data processing device relating to the present invention can further comprise a local mode processing unit for temporarily halting reading of the data inputted by the data management unit and outputting the data read beforehand by the data management unit to the transmission data providing unit. It is therefore possible to handle transmission data for long periods even in systems where there are no host computers by making files beforehand. Namely, automatic operation is possible even for small-scale broadcast stations having no host by preparing transmission data as files. This is a particularly effective function over, for example, Christmas or the new year etc. when operators are on holiday for long periods.

Moreover, the transmission data processing device of the present invention can further comprise a rehearsal unit for previewing the read data inputted by the data management unit. Rehearsal transmissions for all of a large amount of transmission data is then possible using transmission data stored at files.

Further, the transmission data processing device relating to the present invention can further comprise a dispatch unit for only outputting control instruction data of the inputted data to the data management unit and the transmission unit or to the transmission unit, and outputting data other than the control instruction data to the data management unit. A system configuration where control instruction signals are provided from a host computer can therefore be adopted so as to give more effective functionality.

As the transmission data processing method and device relating to the present invention adopt a configuration where transmission data is automatically temporarily stored in large capacity files, it is possible to receive large amounts of transmission data and system efficiency is raised by controlling supply of amounts of transmission data to the transmission system to be within the range of the processing power of the transmission system. In particular, the receiving and saving of large quantities of data, which depend on the capacity of an external storage device such as a hard disc etc. rather than the throughput of a computer, is possible, with the results of this function being substantial.

What is claimed is:

1. A transmission data processing method for transmitting inputted data, comprising:

a data management step of reading inputted said data, managing read said data and transmitting said data;

a transmission data providing step of outputting said data outputted in said data management step as transmission data; and a transmission step of holding said transmission data outputted in said transmission data providing step in prescribed units and transmitting said transmission data at a prescribed time, wherein said transmission data providing step transmits said transmission data to said transmission step within a range such that said transmission data does not exceed said prescribed units, in response to a transmission processing speed of said transmission step for transmitting said transmission data.

2. A transmission data processing method according to claim 1, wherein said data management step further comprises:

a data file management step of reading inputted said data, editing read said data to files and managing said data in file units, and transmitting said data; and a storage step of storing said data edited in file units in said data file management step in a storage means.

3. A transmission data processing method according to claim 2, wherein said storage means is a recording medium capable of being non-linear accessed.

4. A transmission data processing method according to claim 2, wherein said data file management step further comprises:

a data reading step of reading inputted said data and transmitting said data; and a file management step of editing said data read in in said data reading step and managing said data stored in said storage means in file units.

5. A transmission data processing method according to claim 1, further comprising an editing step of editing said data read in said data management step.

6. A transmission data processing method according to claim 1, further comprising:

a local mode processing step of temporarily halting reading of said data inputted in said data management step and outputting said data read beforehand in said data management step to said transmission data providing step.

7. A transmission data processing method according to claim 1, further comprising a rehearsal step for previewing read said data inputted in said data management step.

8. A transmission data processing method according to claim 1, further comprising a dispatch step of only outputting control instruction data of inputted said data to said data management step and said transmission step or to said transmission step, and outputting data other than said control instruction data to said data management step.

9. A transmission data processing device for transmitting inputted data, comprising:

data management means for reading inputted said data, managing read said data and transmitting said data;

transmission data providing means for outputting said data outputted from said data management means as transmission data; and transmission means for holding said transmission data outputted by said transmission data providing means in prescribed units and transmitting said transmission data at a prescribed time, wherein said transmission data providing means transmits said transmission data to said transmission means within a range such that said transmission data does not exceed said prescribed units, in response to a transmission processing speed of said transmission means for transmitting said transmission data.

10. A transmission data processing device according to claim 9, wherein said data management means further comprises:

data file management means for reading inputted said data, editing read said data to files and managing said data in file units, and transmitting said data; and storage means for storing said data edited in file units by said data file management means.

11. A transmission data processing device according to claim 10, wherein said storage means is a recording medium capable of being non-linear accessed.

12. A transmission data processing device according to claim 10, wherein said data file management means further comprises:

data reading means for reading inputted said data and transmitting said data; and file management means for editing said data read in by said data reading means and managing said data stored in said storage means in file units.

13. A transmission data processing device according to claim 9, further comprising editing means for editing said data read by said data management means.

14. A transmission data processing device according to claim 9, further comprising:

local mode processing means for temporarily halting reading of said data inputted by said data management means and outputting said data read beforehand by said data management means to said transmission data providing means.

15. A transmission data processing device according to claim 9, further comprising rehearsal means for previewing read said data inputted by said data management means.

16. A transmission data processing device according to claim 9, further comprising dispatch means for only outputting control instruction data of inputted said data to said data management means and said transmission means or to said transmission means, and outputting data other than said control instruction data to said data management means.

* * * * *